Dec. 13, 1938.  V. V. VACQUIER  2,140,097
ROCK SAMPLING METHOD
Filed June 6, 1938
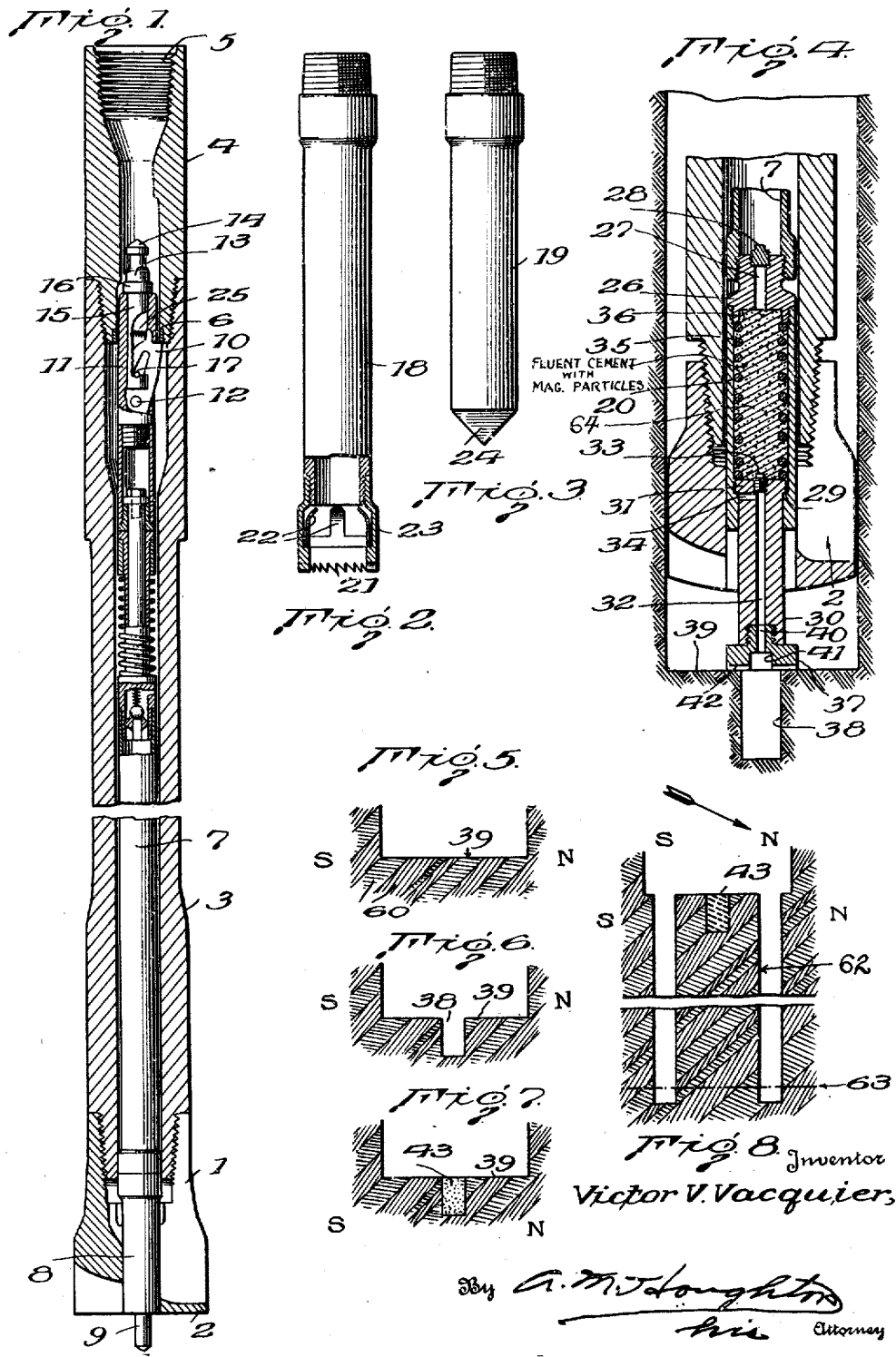
Inventor
Victor V. Vacquier,
By A. M. Loughton
his Attorney

UNITED STATES PATENT OFFICE 2,140,097

ROCK SAMPLING METHOD

Victor V. Vacquier, Oakmont, Pa., assignor to Gulf Research & Development Company, Pittsburgh, Pa., a corporation of Delaware Application June 6, 1938, Serial No. 212,142

7 Claims. (Cl. 255—72)

This invention or discovery relates to improvements in rock sampling methods; and it comprises a method of taking rock core samples in core drilling, including the steps of introducing adjacent the rock to be sampled a charge of magnetically susceptible particles in a temporary condition such as to be capable of polar orientation under the influence of the earth's magnetic field, allowing such orientation to take place and to become fixed, and removing a core sample of the rock containing the oriented charge, whereby the original orientation of the rock before removal can be determined; all as more fully hereinafter set forth and as claimed.

In studying underground geological formations it is desirable to secure information as to the character of the rock at various underground levels, and also as to the dip and strike of the rock masses if they occur in strata (i. e. definite layers or beds). Information as to the dip and strike of buried rock strata, at several points over an area, shows whether the strata are horizontal or are faulted or warped into anticlines, synclines, etc.

Core drilling is a well known method of investigating subsurface geology. It is sometimes carried out incidentally to well drilling, and sometimes as an independent procedure. In core drilling, a tubular bit is used, arranged to drill out and break off and remove a cylindrical core of rock. Examination of the core reveals the character of the rock at the level at which the sample was taken, but ordinarily yields no information as to the direction of dip of the rock. Cores of sedimentary rock often show dipping bedding planes quite clearly, but there has been no very convenient way of ascertaining what was the original orientation of the rock in the earth before removal, because the drill twists around during removal and moreover because the drill may not have been exactly vertical when the sample was taken. Thus while the removed core shows dip, there is no direct way of telling the direction the dip takes in the earth. Taking a plurality of core samples over a small area makes possible such determination, by revealing the same stratum of rock lying at different levels in the different wells, but this expedient is costly.

According to the present invention there is provided a simple and effective way of taking core samples in which the original orientation of the core prior to removal can be determined from an examination of the core at the surface of the earth. This is achieved by introducing into the rock, before a core sample thereof is removed, a body of magnetically susceptible particles in a temporarily free or non-oriented state, letting the particles become oriented solely under the influence of the earth's magnetic field and fixed in such orientation, and taking a core sample containing the fixed particles. The removed core has remanent magnetism; it is thereby magnetically marked, so to speak. The particles are arranged parallel to the direction of the earth's magnetic field for the locality, and by determining the constants of polarity of the particles on the core with the aid of a sensitive magnetometer used in a known way; the original orientation of the core in the earth can be found, and true dip and strike determined. Thus a single coring suffices to determine the direction of dip of the rocks adjacent the well bore.

The invention may be carried out in any one of several different ways. For example, after drilling has proceeded to the desired depth in a known way, I sometimes drill a bore somewhat smaller than the core subsequently to be taken and pour into the small bore a fluid suspension of quick setting cement containing magnetized particles of magnetite or other suitable ferro-magnetic particles in suspension. While the cement remains liquid the particles of magnetite orient themselves in the direction of the earth's magnetic field. The cement is then permitted to set in the formation whereby the magnetic particles are fixed or cemented to the core and the core is thereby given a residual or remanent magnetism in the direction of the earth's field. After the cement has set, a core specimen is taken in the usual manner and brought to the surface, where it is oriented as described above.

Another way in which the invention may be carried out is to embed in the rock before sampling a ferro-magnetic substance, raise the temperature of the substance above its "Curie point" which is the temperature (varying with different materials) at which it loses its magnetic properties, and then permit the substance to cool, whereupon it acquires remanent magnetization in the direction of the earth's field. Such a magnetic substance may be fixed in the core prior to heating it above the "Curie point", or it can be heated to a sufficiently high temperature prior to introduction into the core. For instance, a slug of material such as a mixture of cobalt and iron oxides may be heated above 600° C., at which temperature it loses its magnetic properties and subsequently the slug may be fired into the rock as a bullet in a heated condition. Certain other ferro-magnetic substances have lower "Curie points" and are sometimes more convenient.

For the purpose of this invention a fluid suspension of tiny ferro-magnetic particles behaves in a manner quite analogous to the behavior of a mass of a ferro-magnetic substance which is heated above its Curie point. In either the fluid suspension or the heated mass there is a body of ferro-magnetic particles in such a state as to be susceptible of polar orientation under the influence of the earth's magnetic field. A ferro-magnetic mass is considered to be made up of an aggregation of particles each of which behaves as an elemental magnet or dipole. At temperatures above the Curie point it is believed the movement of the dipoles in the mass is quite random, hence the individual magnetic particles in the mass are not oriented and do not exert a cumulative polar effect. As the mass cools, the free energy and random movement of the dipoles becomes less, the elemental magnetic particles then becoming oriented in (alined with) the direction of the earth's field when other magnetic forces are absent. When oriented, these particles exert a cumulative polar effect. As long as the mass remains cool and otherwise magnetically undisturbed the mass of particles retain this orientation and their cumulative effect may be measured to determine the direction of the polar forces with respect to the mass.

With regard to a fluid suspension of finely divided ferro-magnetic particles, each particle is to all intents and purposes a dipole of such minute physical dimensions and mass as to be readily susceptible of orientation when subjected to magnetic forces. While suspended in a fluid, there is relatively slight resistance to such orientation. Therefore, when a fluid suspension of such particles is adapted to set on standing and is left at rest the particles gradually orient themselves in the direction of the earth's magnetic field and, as the suspension sets, the particles become fixed in this oriented position where their cumulative effect may be measured to determine the direction of the polar forces with respect to the mass. Even though the orientation may not be complete, enough polarity is imparted for the present purposes.

In the accompanying drawing I have shown, more or less diagrammatically, certain apparatus useful in carrying out the present invention in some of its specific embodiments and a typical core sample taken by the method of the present invention.

In the showing,

Fig. 1 is a longitudinal sectional view, partly broken away, of a conventional rotary core drill with a retractable inner barrel particularly adapted for the carrying out of the invention;

Fig. 2 shows a replaceable coring bit adapted to replace the small central drill shown in Fig. 1;

Fig. 3 shows a replaceable solid center bit adapted to replace the center bit shown in Fig. 1;

Fig. 4 is a longitudinal sectional view showing in detail a special container for injecting cement suspension into the pilot bore, the container being fitted on the lower extremity of the inner barrel shown in Fig. 1; and Figs. 5, 6, 7 and 8 are diagrammatic views illustrating the several steps of the process.

Referring to the drawing, and more particularly to Fig. 1, the rotary core drill assembly comprises a replaceable outer bit head 1 having welded thereto fish-tail bit blades 2, the head being carried on the hollow drill collar 3 which in turn carries the upper drill collar 4 threaded at its upper end as at 5 to engage the usual string of drill pipe. At its lower end collar 4 is adapted to receive the driving collar 6 for driving the inner barrel. Within the hollow drill collar 3 is a retractable inner barrel 7 carrying at its lower end in threaded engagement a solid center bit head 8 to which is welded at its lowermost portion a drill point 9 of reduced diameter.

The drill point 9 is approximately one inch in diameter and projects two or three inches below the lower extremity of the head 8 which is normally flush with the lower cutting edges of the blade 2. In working position, the inner barrel 7 is placed in driving engagement with the driving collar 6 through the driving dog 10 connected to body member 11 through the dog bolt 12. Body member 11 is in threaded engagement with the barrel 7 at its lower end while at its upper end it carries the head portion 13 having a spear head 14, a bifurcated lower portion 15 and stop collar 16. Connecting the bifurcated segments of the head member is pull bar pin 17 passing through the central slot in dog 10 and adapted to draw the dog 10 within the body member 11 against the force of spring 25, thus disengaging the inner barrel 7 from the driving collar 6 when the spear head 4 is drawn upwardly. The center bit head 8 is adapted to be replaced by bit heads 18 or 19 shown in Figs. 2 and 3, respectively, or by container 20 shown in Fig. 4. Bit head 18 is provided at its lower extremity with cutting teeth 21. Near the lower extremity on the inside of the bore a flexible core catcher 22 is carried in a recess 23. The head 18 is of such length that when the inner barrel 7 is in working position the cutter blades 21 project several inches below the cutting blades 2 of the outer drill. The solid bit head 19 carries a wedge-shaped cutter 24, the head 19 being of such length that the cutter 24 is flush with blades 2 when the inner barrel is in working position.

As shown in Fig. 4, the container indicated generally at 20 is connected to the lower end of the retractable barrel 7 by means of a threaded coupling 26, centrally bored as at 27 and provided with a threaded closure plug 28 for purposes hereinafter described. Near the bottom of the cylindrical container 20 the bore thereof is reduced in diameter providing a shoulder 29. Closely fitting and slidable in the small bore at the base of cylinder 20 is a piston member 30 having an enlarged head 31 loosely fitting the large bore in cylinder 20. Piston 30 is centrally bored as at 32, the upper end of the bore being closed by the threaded closure 33. Connecting the central bore 32 with the exterior of the piston is a lateral bore 34 extending into the wall of the piston member 30 immediately below the enlarged head 31. When in position shown in Fig. 4, the under-surface of the head 31 forms a fluid seal with the shoulder 29 of the container while the outlet of bore 34 is sealed by the close fitting walls in the base container 20. A helical compression spring 35 is held in place in container 20 by the internal shoulders 36 on the coupling 26 and exerts its force against the upper side of piston head 31 tending to keep the piston 30 in its lowermost position as shown in Fig. 4. At its lower extremity, piston member 30 carries in threaded engagement a base 37 of enlarged diameter adapted to bridge the pilot hole 38 and thus prevent downward progress of the piston beyond the lower extremity of the well bore 39.

Head 37 is bored centrally as at 40 and 41 to provide openings in registry with bore 32. Lateral channels 42 extend from bore 41 to the exterior of the head. As shown, container 20 may be filled with a fluid suspension of quick setting cement such as a thin slurry of neat Portland cement containing magnetite, or some other suitable fluid suspension of magnetically susceptible particles. If a Portland cement suspension is employed, the initial setting time may be suitably adjusted if necessary by the addition of known accelerators or retarders so that the initial set takes place shortly after injection into the rock.

In operation, the apparatus described may be used in carrying out the invention in the following manner:

The bore is begun by the usual rotary method, the bit head 19 being used in the central barrel until such time as it is desired to take a core sample by the method of the invention. At such time an overshot (not shown) is lowered on a wire line through the hollow drill stem until it engages the spear head 14 of the inner barrel assembly. The inner barrel 7 is then retracted on the wire line, the upward motion of the pin 17 serving to retract the dog 10 and free the inner barrel from engagement with the outer barrel. At the surface of the well the solid central drill bit 19 is replaced with the drill head 8 and the inner barrel is again introduced into the drill pipe. The string of drill pipe is raised sufficiently to allow the dog to pass the driving collar 6 when the inner barrel reaches the bottom of the drill pipe and then the inner barrel and associated mechanism is lowered through the drill pipe where it comes to rest on the bottom of the hole with the driving dog 10 in extended position. The drill pipe is then lowered to bring the driving collar 6 into engagement with dog 10 and rotated until the small bit 9 has progressed downwardly for its complete length forming the pilot hole 38 as shown in Figs. 4 and 6. Then the inner barrel is again retracted as before and the head 8 is removed.

A suspension is then made of extremely small magnetite particles in a slurry of quick setting cement. Coupling 26 and container 20 with associated mechanism being connected as shown in Fig. 5, the closure 28 is removed and container 20 filled with the suspension by submerging bore 27, then forcing piston 30 into cylinder 29 against the force of spring 35 and allowing the spring to return the piston to the position shown, thereby filling the container. Closure 28 is then screwed into place and the coupling 26 is joined to the end of barrel 7.

The drill pipe is raised about three feet so that the container to be subsequently introduced will project below the bit head, and the barrel 7 is then lowered into the well on a wire line through the drill pipe, the tension on the head member 13 keeping the dog 10 within its recess. As shown in Fig. 4, when the bottom is reached, the base 37 of container 20 will extend about three feet below the extremity of the drill bit 2, the wire line running slack and the dog 10 being pushed from its recess by the spring 25. The drill pipe is then lowered, causing driving collar 6 to engage dog 10. As the weight of the drill pipe is brought to bear on the base 37 of container 20 through the inner barrel 7, piston 30 is forced upward in cylinder 29 against the force of spring 35, the cement suspension 40 being forced thereby through passageways 34, 32, 40, and 41 into the pilot hole 38 previously drilled by the tool 9. Any excess of cement flows laterally outward through ports 42.

Immediately after injecting the cement the outer string 4 is raised about ten feet to prevent distortion of the earth's field in the immediate locality of the pilot hole 38. After raising the outer string 4 either one of two procedures may be followed, depending on the character of the formation from which the sample is to be taken.

Ordinarily, I find it advantageous to remove both the inner barrel and the outer barrel from the well and replace the outer barrel shown with a standard coring device (not shown) adapted to take a core of large diameter, say, about three inches. In formations which are not well consolidated it is practically essential to take a core of this size in order to prevent the core from disintegrating.

After allowing sufficient time for the cement to set, the formation is cored in the usual manner and, as shown in Fig. 8, the core sample contains a plug of magnetic material 43 which is polarized in the direction of the earth's magnetic field.

When the formation from which the sample is to be taken consists of a well consolidated and not easily friable rock, the above procedure can be simplified somewhat by operating in the following manner.

Instead of boring the pilot hole with the drill bit 9 as shown in Fig. 1, a drill head having a smaller diameter bit, say one of about one-half inch diameter, is substituted. After drilling the pilot hole (which is correspondingly smaller than that shown in Figs. 4 and 6), the same procedure is used to inject the magnetic suspension therein and the inner barrel assembly is withdrawn on the wire line. The container 20 may then be replaced by the core bit 18 shown in Fig. 2, after which the inner barrel 7 and associated parts are dropped through the drill pipe after raising the outer string 4 sufficiently to allow the dog 10 to pass the driving collar 6. The outer string 4 is lowered to bring collar 6 in driving engagement with the dog 10 and a core is taken in the usual manner and recovered by pulling the inner barrel 7 on a wire line. The core taken with the coring device 18 is only slightly larger than the plug injected and, consequently, the procedure last described is best suited for use in well consolidated rocks. It has the advantage of obviating the necessity for removing the outer string 4 when the core is to be taken.

As before stated, in orienting the core sample recovered according to the present invention it may be brought close to a sensitive magnetic needle, the direction of its magnetization determined and marked on the core. The direction of the earth's magnetic field at the location of the bore being known, the core may then be oriented by pointing the marker in that direction. With the core oriented, the strike, or the direction of dip (the direction at right angles to the strike), of the bedding planes may be precisely determined.

Figs. 5 to 8 illustrate the conditions at the coring level during the several steps of the process. The views are vertical sections of the rock taken along a plane including the earth's magnetic meridian, that is, a vertical plane running north and south (magnetic north and south). The vector arrow in Fig. 8 indicates the direction of the earth's field; the vector in the general case being inclined with respect to horizontal, as shown, and of inclination varying with the (magnetic) latitude of the locality. Fig. 5 shows the bore bottom 39, in inclined strata indicated at 60. Fig. 6 shows the bottom after the pilot hole 38 is formed, and Fig. 7 shows the hole filled with a plug of fluent suspension (61) of magnetic particles as described. Fig. 8 shows the rock core 62 cut by the core drill, in place, just before it is broken off (e. g. at 63) in known ways and raised to the surface. The magnetite, etc. particles of the solidified plug are permanently oriented in alinement with the direction of the earth's magnetic field, as indicated schematically in the figure, and on withdrawing the core to the surface, it is sufficient to determine the polarity of the plug, to find how the core was originally oriented; the direction of the earth's magnetic field for the locality being known from other data. Even if the core drill was out of plumb when the sample was taken, the measurements are not vitiated.

The invention has been described in connection with oil well drilling, but it can, of course, be used in making geological surveys in other fields.

While the invention has been specifically described in connection with various apparatus, the invention is not to be considered as limited thereby; the scope of the invention being characterized by the following claims.

What I claim is:

1. In the art of rock sampling during deep drilling, the improvement which comprises the steps of introducing into the rock to be sampled a body of ferro-magnetic particles in such a state as to be susceptible of polar orientation under the influence of the earth's magnetic field, allowing said particles to become so oriented and fixing the particles to the rock while so oriented, and removing a sample of rock containing the fixed particles, thereby providing a magnetic index by means of which the original position of the sample in the earth can be determined after removal.

2. In the art of rock sampling during deep drilling, the improvement which comprises the steps of introducing contiguously to the rock to be sampled a body of ferro-magnetic particles in such a state as to be susceptible of polar orientation under the influence of the earth's magnetic field, allowing said particles to become so oriented in the absence of forces which distort the earth's field in the immediate locality of said particles, fixing the space relationship between the particles while so oriented and the rock to be sampled and removing a sample of the rock together with said particles without varying said fixed space relationship.

3. In the art of rock sampling during deep drilling, the improvement which comprises introducing into the rock to be sampled a body of tiny ferro-magnetic particles in fluid suspension capable of adhering to rock, said suspension being adapted to set a relatively short time after said introduction and allowing the suspension to set in the absence of forces which distort the earth's field in the locality of said suspension.

4. In the art of rock sampling during deep drilling, the improvement which comprises boring a pilot hole in the rock to be sampled, introducing into said pilot hole a suspension of tiny ferromagnetic particles in fluid cement and allowing the cement suspension to set in cemented relation to the rock and in the absence of forces that distort the earth's magnetic field in the immediate locality of the pilot hole, whereby the prospective sample is provided with a remanent magnetization in the direction of the earth's field.

5. In the art of taking and orienting rock samples, a method which comprises introducing contiguously to the prospective rock sample a body of ferro-magnetic particles in such a state as to be adapted to become oriented under the influence of the earth's magnetic field, allowing said particles to become so oriented in the absence of forces which distort the earth's magnetic field in the immediate vicinity of the prospective sample, fixing the relationship between said particles while so oriented and said prospective sample, removing said sample together with said particles without varying their fixed relationship and determining the direction of remanent magnetization in said particles, whereby an index is afforded of the original position of said sample in the earth.

6. A method of taking rock core samples which comprises introducing into the rock to be cored a charge of magnetically susceptible material in a condition temporarily capable of polar orientation under the influence of the earth's magnetic field, allowing such orientation to take place and become fixed, and removing a core sample of the rock containing said materials.

7. A method of taking rock core samples in wells which comprises drilling a small hole in the rock at the well bottom, introducing directly into the hole a body of minute ferro-magnetic particles suspended in a temporarily fluent cement capable of setting in time with the particles oriented parallel to the earth's magnetic field, and taking a core sample from the well bottom including said set body of particles cemented in place in the rock, whereby orientation of the core can be determined by observation of the magnetic properties of the core sample containing the cemented particles.

VICTOR V. VACQUIER.

DISCLAIMER 2,140,097.—*Victor V. Vacquier*, Oakmont, Pa. ROCK SAMPLING METHOD. Patent dated December 13, 1938. Disclaimer filed May 17, 1940, by the assignee, *Gulf Research & Development Company*.

Hereby disclaims from said patent, claims 1, 2, 3, and 5, and disclaims from claim 6 any interpretation thereof wherein the charge of magnetically susceptible material introduced into the rock is not put temporarily into a non-magnetic condition, before or after its introduction into the rock.

[*Official Gazette June 18, 1940.*]

netic) latitude of the locality. Fig. 5 shows the bore bottom 39, in inclined strata indicated at 60. Fig. 6 shows the bottom after the pilot hole 38 is formed, and Fig. 7 shows the hole filled with a plug of fluent suspension (61) of magnetic particles as described. Fig. 8 shows the rock core 62 cut by the core drill, in place, just before it is broken off (e. g. at 63) in known ways and raised to the surface. The magnetite, etc. particles of the solidified plug are permanently oriented in alinement with the direction of the earth's magnetic field, as indicated schematically in the figure, and on withdrawing the core to the surface, it is sufficient to determine the polarity of the plug, to find how the core was originally oriented; the direction of the earth's magnetic field for the locality being known from other data. Even if the core drill was out of plumb when the sample was taken, the measurements are not vitiated.

The invention has been described in connection with oil well drilling, but it can, of course, be used in making geological surveys in other fields.

While the invention has been specifically described in connection with various apparatus, the invention is not to be considered as limited thereby; the scope of the invention being characterized by the following claims.

What I claim is:

1. In the art of rock sampling during deep drilling, the improvement which comprises the steps of introducing into the rock to be sampled a body of ferro-magnetic particles in such a state as to be susceptible of polar orientation under the influence of the earth's magnetic field, allowing said particles to become so oriented and fixing the particles to the rock while so oriented, and removing a sample of rock containing the fixed particles, thereby providing a magnetic index by means of which the original position of the sample in the earth can be determined after removal.

2. In the art of rock sampling during deep drilling, the improvement which comprises the steps of introducing contiguously to the rock to be sampled a body of ferro-magnetic particles in such a state as to be susceptible of polar orientation under the influence of the earth's magnetic field, allowing said particles to become so oriented in the absence of forces which distort the earth's field in the immediate locality of said particles, fixing the space relationship between the particles while so oriented and the rock to be sampled and removing a sample of the rock together with said particles without varying said fixed space relationship.

3. In the art of rock sampling during deep drilling, the improvement which comprises introducing into the rock to be sampled a body of tiny ferro-magnetic particles in fluid suspension capable of adhering to rock, said suspension being adapted to set a relatively short time after said introduction and allowing the suspension to set in the absence of forces which distort the earth's field in the locality of said suspension.

4. In the art of rock sampling during deep drilling, the improvement which comprises boring a pilot hole in the rock to be sampled, introducing into said pilot hole a suspension of tiny ferromagnetic particles in fluid cement and allowing the cement suspension to set in cemented relation to the rock and in the absence of forces that distort the earth's magnetic field in the immediate locality of the pilot hole, whereby the prospective sample is provided with a remanent magnetization in the direction of the earth's field.

5. In the art of taking and orienting rock samples, a method which comprises introducing contiguously to the prospective rock sample a body of ferro-magnetic particles in such a state as to be adapted to become oriented under the influence of the earth's magnetic field, allowing said particles to become so oriented in the absence of forces which distort the earth's magnetic field in the immediate vicinity of the prospective sample, fixing the relationship between said particles while so oriented and said prospective sample, removing said sample together with said particles without varying their fixed relationship and determining the direction of remanent magnetization in said particles, whereby an index is afforded of the original position of said sample in the earth.

6. A method of taking rock core samples which comprises introducing into the rock to be cored a charge of magnetically susceptible material in a condition temporarily capable of polar orientation under the influence of the earth's magnetic field, allowing such orientation to take place and become fixed, and removing a core sample of the rock containing said materials.

7. A method of taking rock core samples in wells which comprises drilling a small hole in the rock at the well bottom, introducing directly into the hole a body of minute ferro-magnetic particles suspended in a temporarily fluent cement capable of setting in time with the particles oriented parallel to the earth's magnetic field, and taking a core sample from the well bottom including said set body of particles cemented in place in the rock, whereby orientation of the core can be determined by observation of the magnetic properties of the core sample containing the cemented particles.

VICTOR V. VACQUIER.

DISCLAIMER 2,140,097.—*Victor V. Vacquier*, Oakmont, Pa. ROCK SAMPLING METHOD. Patent dated December 13, 1938. Disclaimer filed May 17, 1940, by the assignee, *Gulf Research & Development Company*.

Hereby disclaims from said patent, claims 1, 2, 3, and 5, and disclaims from claim 6 any interpretation thereof wherein the charge of magnetically susceptible material introduced into the rock is not put temporarily into a non-magnetic condition, before or after its introduction into the rock.

[*Official Gazette June 18, 1940.*]